(12) United States Patent
Tata et al.

(10) Patent No.: US 11,501,186 B2
(45) Date of Patent: Nov. 15, 2022

(54) ARTIFICIAL INTELLIGENCE (AI) BASED DATA PROCESSING

(71) Applicant: ACCENTURE GLOBAL SOLUTIONS LIMITED, Dublin (IE)

(72) Inventors: Swati Tata, Bangalore (IN); Abhishek Gunjan, Gaya (IN); Pratip Samanta, Bangalore (IN); Madhura Shivaram, Bangalore (IN); Ankit Chouksey, Bhopal (IN); Arnest Tony Lewis, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 906 days.

(21) Appl. No.: 16/287,605

(22) Filed: Feb. 27, 2019

(65) Prior Publication Data

US 2020/0272915 A1    Aug. 27, 2020

(51) Int. Cl.
```
G06N 20/00      (2019.01)
G06N 5/04       (2006.01)
G06F 16/36      (2019.01)
G06F 16/35      (2019.01)
G06F 40/30      (2020.01)
G06F 40/205     (2020.01)
G06F 40/253     (2020.01)
G06F 40/284     (2020.01)
G06N 20/10      (2019.01)
G06N 20/20      (2019.01)
```

(52) U.S. Cl.
CPC .............. G06N 5/04 (2013.01); G06F 16/35 (2019.01); G06F 16/367 (2019.01); G06F 40/205 (2020.01); G06F 40/253 (2020.01); G06F 40/284 (2020.01); G06F 40/30 (2020.01); G06N 20/00 (2019.01); G06N 20/10 (2019.01); G06N 20/20 (2019.01)

(58) Field of Classification Search
CPC .......... G06N 5/04; G06N 20/00; G06N 20/20; G06N 20/10; G06F 16/367; G06F 16/35; G06F 40/253; G06F 40/284; G06F 40/205; G06F 40/30
See application file for complete search history.

(56) References Cited

U.S. PATENT DOCUMENTS 10,157,347 B1 * 12/2018 Kasturi ............... G06F 16/3326
2005/0171948 A1 * 8/2005 Knight ................. G06F 16/313
                                                    707/E17.084

(Continued)

Primary Examiner — Casey R. Garner
(74) Attorney, Agent, or Firm — Mannava & Kang, P.C.

(57) ABSTRACT

An Artificial Intelligence (AI)-based data processing system employs a trained AI model for extracting features of products from various product classes and building a product ontology from the features. The product ontology is used to respond to user queries with product recommendations and customizations. Training data for the generation of the AI model for feature extraction is initially accessed and verified to determine of the training data meets a data density requirement. If the training data does not meet the data density requirement, data from one of a historic source or external sources is added to the training data. One of the plurality of AI models is selected for training based on the degree of overlap and the inter-class distance between the datasets of the various product classes within the training data.

20 Claims, 16 Drawing Sheets

(56) References Cited

U.S. PATENT DOCUMENTS

| | | | |
|---|---|---|---|
| 2009/0300052 A1* | 12/2009 | Grichnik | G05B 17/02 |
| | | | 707/999.102 |
| 2014/0201126 A1 | 7/2014 | Zadeh et al. | |
| 2016/0180437 A1* | 6/2016 | Boston | G06Q 30/0631 |
| | | | 705/26.7 |
| 2017/0011111 A1* | 1/2017 | Pallath | G06F 16/2465 |
| 2018/0247221 A1* | 8/2018 | Park | G06F 40/20 |
| 2018/0276728 A1 | 9/2018 | Psota et al. | |
| 2019/0278777 A1* | 9/2019 | Malik | G06F 16/9024 |
| 2020/0285903 A1* | 9/2020 | Rogers | G06N 20/00 |
| 2020/0293564 A1* | 9/2020 | Reh | G06F 16/36 |
| 2021/0073892 A1* | 3/2021 | Shi | G06Q 30/0256 |

* cited by examiner

| Sno | Category | Feature | P(L1) | Sub-Features | P(L2) |
|---|---|---|---|---|---|
| 1 | Sandwich | Sauce | 0.18 | chili sauce | 0.111111111 |
| 2 | Sandwich | Sauce | 0.18 | bbq sauce | 0.333333333 |
| 3 | Sandwich | Sauce | 0.18 | peri peri sauce | 0.111111111 |
| 4 | Sandwich | Sauce | 0.18 | MTP sauce | 0 |
| 5 | Sandwich | Sauce | 0.18 | secret sauce | 0.111111111 |
| 6 | Sandwich | Sauce | 0.18 | buffalo sauce | 0.111111111 |
| 7 | Sandwich | Sauce | 0.18 | speciality sauce | 0 |
| 8 | Sandwich | Salad | 0.08 | german potato salad | 0.25 |
| 9 | Sandwich | Salad | 0.08 | simple salad | 0.25 |
| 10 | Sandwich | Roll | 0.1 | toasted roll | 0.2 |
| 11 | Sandwich | Salad | 0.08 | portueguese roll | 0 |
| 12 | Sandwich | Fries | 0.2 | regular fries | 0.1 |
| 13 | Sandwich | Fries | 0.2 | french fries | 0.5 |
| 14 | Sandwich | Fries | 0.2 | stable fries | 0.1 |
| 15 | Sandwich | Onion | 0.22 | red onion | 0.272727273 |
| 16 | Sandwich | Onion | 0.22 | grilled onion | 0.090909091 |
| 17 | Sandwich | Onion | 0.22 | crispy onion | 0.090909091 |

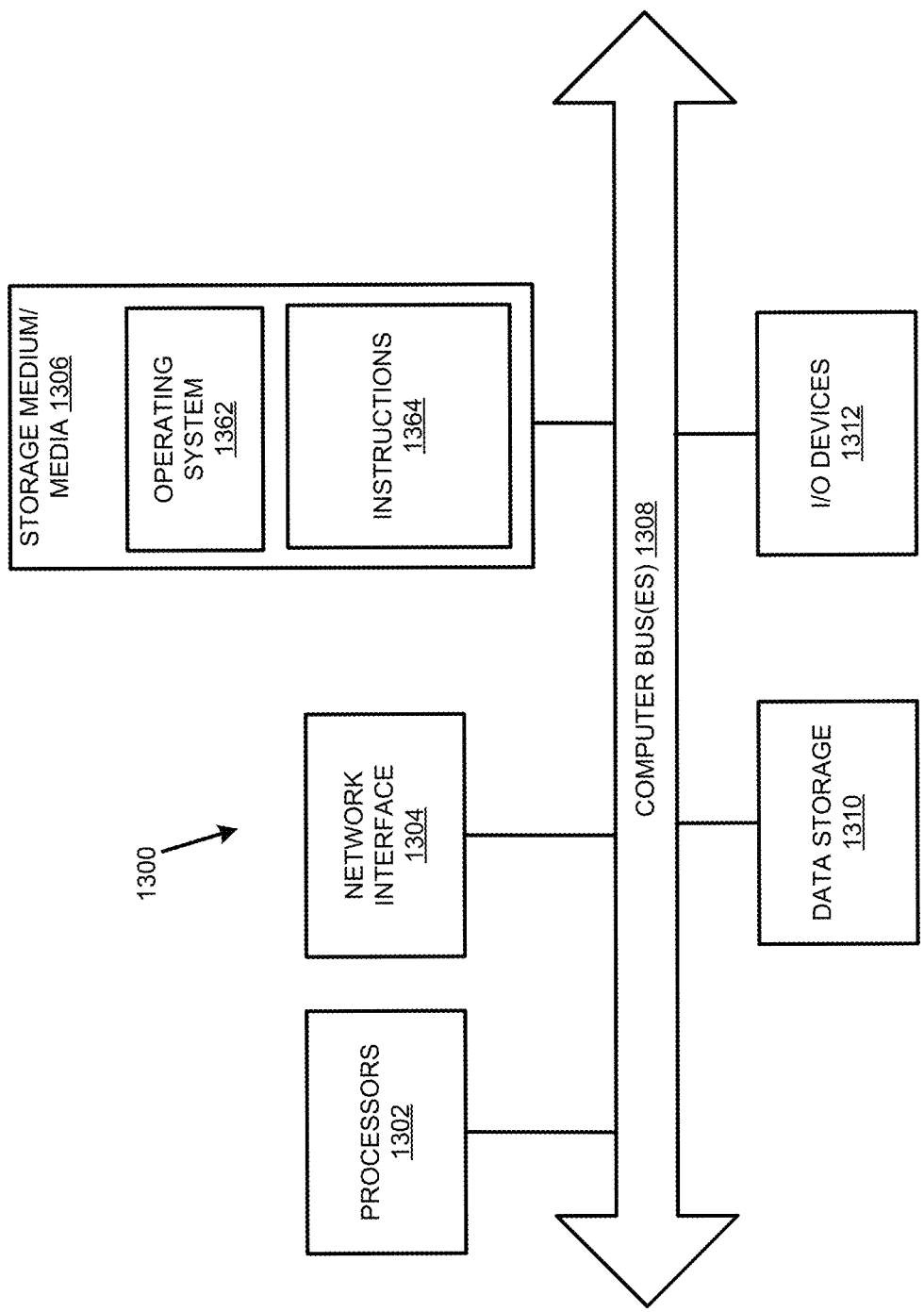

ARTIFICIAL INTELLIGENCE (AI) BASED DATA PROCESSING

BACKGROUND

Automation and Artificial Intelligence (AI) are transforming the various aspects of human society by increasing productivity. AI makes use of data generated from different systems by organizing the data into logical structures, analyzing the data and deriving useful insights. As a result, AI finds applications in numerous domains like gene explorations to everyday requirements like identifying products per customers' specifications. In the present world where large volumes of unstructured data like product names and several associations between the products and attributes exist, it's a tedious task to manually keep track of millions of available products. Such processes are not only time consuming but are also error-prone and are too dependent on the domain knowledge of the human operators.

BRIEF DESCRIPTION OF DRAWINGS

Features of the present disclosure are illustrated by way of examples shown in the following figures. In the following figures, like numerals indicate like elements, in which:

FIG. 9B shows a tabular form with the features, sub-features and context scores obtained in accordance with the examples disclosed herein.

FIG. 12 shows a customization template that is generated for restaurant menus in accordance with the examples disclosed herein.

FIG. 13 illustrates a computer system that may be used to implement the AI-based data processing system in accordance with the examples disclosed herein.

DETAILED DESCRIPTION

Figure 1:
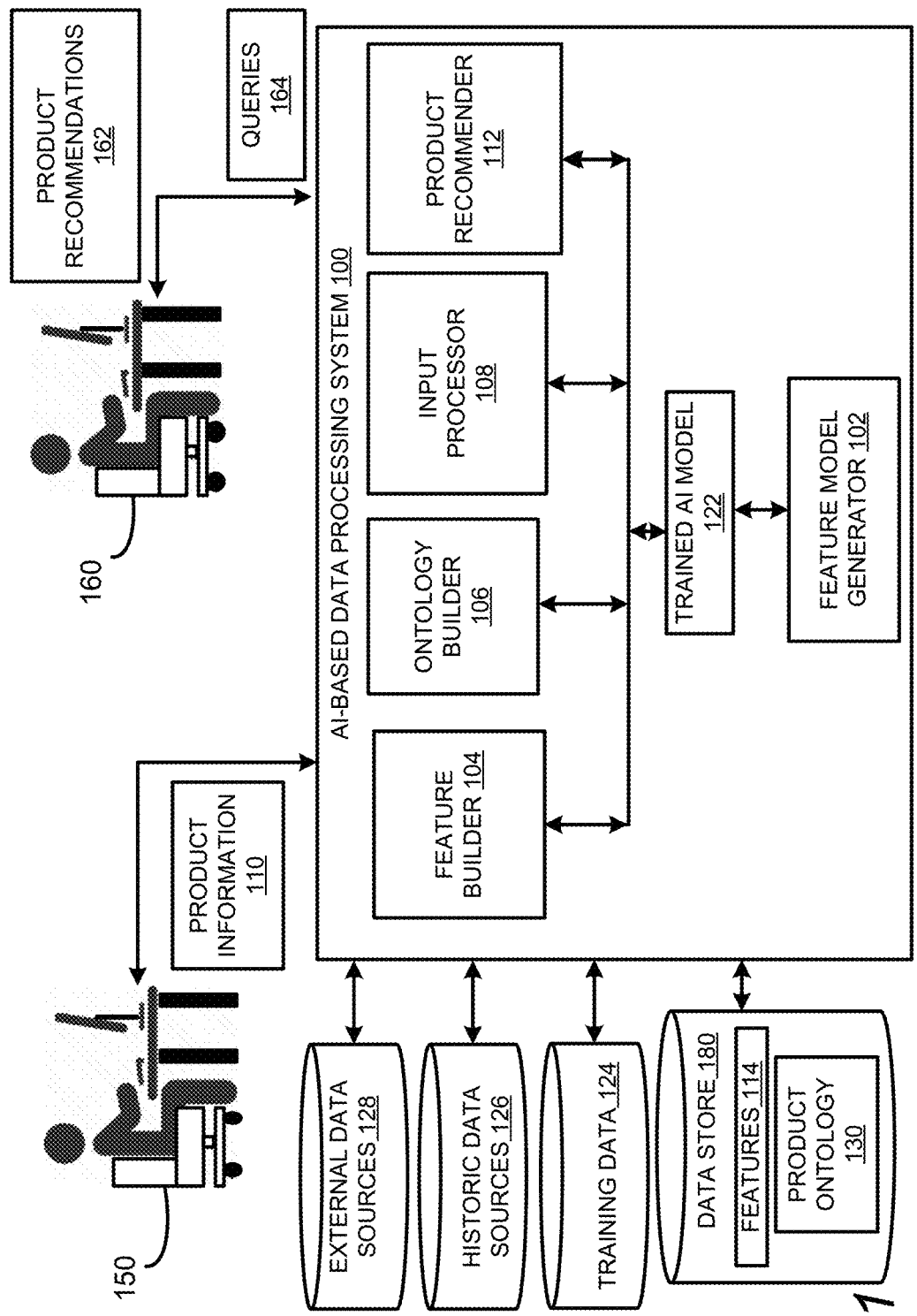
FIG. 1 is a block diagram that shows an AI-based data processing system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based data processing system is disclosed herein. The data processing system employs a trained AI model to automatically extract features of products belonging to a plurality of product classes from product information and builds a product ontology including the extracted product features. When the data processing system receives requests from end users for product recommendations, the product ontology is used to identify products with similar features as those included in the user requests. Furthermore, customizations for the various products to be recommended are also identified and recommended to the end users.

The data processing system generates the trained AI model using training data that is initially examined to determine if the training data meets a data density requirement. Training data can include data related to the various products and the product features within a domain in which the data processing system is to operate to provide user recommendations. The data density requirement can include a per-class density requirement for a minimum number of data points for each of the plurality of product classes that are required to train an AI model to extract features thereof. Accordingly, in order to determine if the training data meets the data density requirement, the distances between the data points in the training data are obtained. From the distances thus obtained, the nearest neighbor distances for each of the points are identified. The mean of the nearest neighbor distances is compared to a distance threshold. If the mean clears the distance threshold the training data meets the data density requirement and no additional data points are needed. If the mean does not clear the distance threshold, it indicates that the training data is sparse and needs to be enriched with additional data.

If the training data meets the data density requirement, an AI model is selected from a plurality of AI models based on the inter-class distances of the various data sets and the overlap between the data sets. The selected AI model is trained for feature extraction. If the training data does not meet the data density requirement, then additional data points can be added from one of the historic sources or external sources. Data can be added from the historic sources depending on whether the historic data is accurate despite the time lag between the collection of the historic data and the usage of the historic data for training purposes. If the historic data is inaccurate and cannot be used, then external data sources are accessed. In an example, a domain-specific crawler is configured to access particular webpages to collect the particular data that can be added to enrich the training data. Techniques such as but not limited to mixture density injection along with exponential descent based on an increase in density injection are employed for enriching the training data. The enriched training data is then used for training an AI model selected from a plurality of AI models such as but not limited to, random forests or support vector machines (SVMs) etc. The trained AI model thus generated is employed for feature extraction.

When an administrative user provides product information related to products of a plurality of product classes, the product information is initially processed for parsing, tokenizing and tagging with parts of speech (POS) information. Topic extraction in addition to noun-form extraction are implemented. Therefore, in addition to nouns, the probability of occurrence of particular adjectives with specific nouns are estimated. Boundary based processing is further employed to clean up the boundary words in the features to identify the root features.

The relationships between the various features are established in order to build a product ontology. In an example, the product ontology can include a knowledge graph wherein the various features are arranged in a plurality of layers based on the relationships. The topics extracted from the product information which can include product names and descriptions can be identified as features of the top layer. The root features obtained by cleaning up the boundary words can be arranged as the features for the second layer. The noun-based features that include nouns in combination with other parts of speech such as adjectives can form a third layer in the knowledge graph. The root features therefore form the connecting relationships between the top layer and the third layer. It can be appreciated that only three layers are discussed herein by way of example, and that a knowledge graph can have any number of layers as required based on the product features. In an example, contextual scores can also be used to associate features with the plurality of product classes.

When an end user query or a request for information is received, it is parsed, tokenized and tagged with POS data. The similarities between the tokens obtained from the user query and the features in the product ontology are obtained. In an example, methodologies such as geodesic distances which identify the shortest path between the vertices can be implemented. Thus, products that match the user's requirements are identified. However, the data processing system further enables identifying customizations for the products from the knowledge graphs. Multi-variant graphical representations of the feature clusters pertaining to the different product classes are created. The closest distances between the nuclei are used to recommend the best possible customizations on the product.

In the current times of big data, a large volume of data includes unstructured data like product names and several associations between the products and the attributes. So it is a tedious task to manually keep track of millions of available products. There are too many features to distinguish one product from another and find a product that maps to the users' interest. Obtaining information about a product given a short description of the product, requires the data entry operators or analysts to review multiple web-sites and documents in order to determine the different features associated with the product. This often results in errors and in-complete data, as it mostly depends on the domain knowledge of the analysts and the sources that the analyst goes through are limited. To find similar products or to find the product that the end user is looking for based on couple of features of the product is even more difficult since most often, the feature list of a product is different for each data source. Hence, finding similar products or clustering the products can be a challenging task as there is no single knowledge base of the list of the products. Though the products and features, can be identified over time, it is very time consuming and a human being can process only a limited set of resources.

The methodology disclosed herein provides a technological solution to the aforementioned issues with data processing by not only automatically extracting features but also by providing knowledge graphs that are automatically updated as new data is received. More particularly, the data processing system as detailed in accordance with the examples herein, accesses the names of the products across multiple web-sites and documents, extracts the product information, automatically predicts the features of the products via machine learning algorithms and identifies the associations/relations between the different features of the product create a knowledge graph of the products. As a result, the knowledge graph forms a central repository where information from hundreds of web-sites regarding a large number of products can be stored and reviewed. Also, the knowledge base (or knowledge graph) is very rich including the semantic features of the product. The knowledge graph builds itself as it automatically identifies the semantic and syntactic relationships between the different features of the product via distance metrics-based algorithms. Not only does the knowledge graph help the data entry operators automatically record product attributes, it also helps the end users to get information about different products across multiple dimensions and multiple levels of the product definition. The data processing system disclosed herein also helps users to use natural language to query the knowledge graphs and get subjective, qualitative and quantitative information from the knowledge base.

FIG. 1 is a block diagram that shows an AI-based data processing system 100 in accordance with examples disclosed herein. The AI-based data processing system 100 receives product information 110 related to many products which can be categorized under a plurality of product classes. The product information 110 can be supplied by a data entry operator 150 or other administrative user of the data processing system 100. The data processing system 100 processes the product information 110 to extract the features 114 of the products referred to therein and categorizes the products into different product classes. In addition, the data processing system 100 also builds a product ontology 130 which can be employed to provide product recommendations 162 to an end user 160. Examples are discussed herein pertaining to restaurant menu items for illustrating the various elements of the data processing system 100. However, it can be appreciated that the products can pertain to a variety of product domains ranging from restaurant menu items, financial products to computer hardware items or even machinery used in factories etc.

The data processing system 100 includes a feature model generator 102, a feature builder 104, an ontology builder 106, a input processor 108 and a product recommender 112. In addition, the data processing system 100 can include processing resources as detailed further herein along with a data store 180 for storing required data. The feature model generator 102 generates a trained AI model 122 which is employed by the feature builder 104 for extracting the product features 114 from the product information 110. The feature model generator 102 initially determines if the training data 124 accessible for the model training has sufficient density or meets certain data sufficiency requirements using a scoring methodology. If the training data 124 meets the data sufficiency requirement, the training data 124 can be used for training the AI model 122. If the training data 124 does not meet the data density requirement, additional data from historical data sources 126 or external data sources 128 can be added to the training data 124. In an example, the training data 124 can include labelled domain-specific data. The historical data sources 126 can include domain-specific data sources including data related to the functionality associated with the data processing system 100. For example, if the products include restaurant menu items, the historic data sources 126 can include labelled data such as the various menu items sorted into various product classes based on their ingredients and method of cooking or other descriptive elements. The external data sources 128 can include particular websites with the various menu items sorted into various product classes based on their ingredients and method of cooking or other descriptive elements. The training data 124 thus enriched with the additional data is then used to train an AI model selected from a plurality of AI models in accordance with the examples disclosed herein for generating the trained AI model 122.

In an example, the product information 110 can include data regarding additional products not referred to in the training data 124. The product information 110 can be initially processed by the input processor 108 for parsing and tokenization. The tokens generated from the product information 110 are received by the feature builder 104 which employs the trained AI model 122 for extracting the features 114 of the products. As mentioned above, while the product information from various product domains can be analyzed by the data processing system 100, examples of food items will be discussed herein for illustration purposes. Accordingly, the product information 110 can pertain to a restaurant menu. The feature builder 104 can automatically extracts features 114 of the various menu items (i.e., products) from a processor readable copy of the restaurant menu card. In an example, the features 114 thus extracted from the restaurant menu items can be further processed to automatically identify particular ingredients thereby enabling the ontology builder 106 to build a product ontology 130.

The product information 110 can be stored in the product ontology 130 in the form of the extracted and processed features, categorized products and the relationships therebetween. In an example, the product ontology 130 can include knowledge graphs with the information regarding the products and product features arranged in different layers. The knowledge graphs can include multi-variant graphical representation of clusters of similar products wherein distance metrics are employed to cluster similar products. Referring again to the example of food items, the distance metrics are suited for predicting the large variations in customizations of food items with the various options which cannot be otherwise predicted using traditional prediction methods. Accordingly, the relationships between the products, the product classes and the features of the various products can also be represented in the product ontology 130. In an example, the difference between the radius and the diameter i.e., the minimum and the maximum eccentricities of the knowledge graph are kept to a minimum. This can help in identifying and grouping the customizations and predict the customizations of a product from the knowledge graph. As new product information is received, the feature builder 104 can use the trained AI model 122 to extract the features. For example, instead of being manually fed the product information by the data entry operator 150, the data processing system 100 can be configured to automatically pull product information from certain data sources e.g., specific folders in a local network, in order to be regularly updated. The ontology builder 106 can then automatically update the product ontology 130 with the relevant information as detailed herein.

The product ontology 130 thus built can be used to respond to user queries 164 or user requests for information regarding the products. The input processor 108 is configured to process the product information 110 and natural language queries from end users. The word tokens along with the POS information obtained from the user queries is received by the product recommender 112. The product recommender 112 can employ similarity techniques to identify products with similar features from the product ontology 130. The identified products are transmitted as product recommendations to the end users. In an example, distance techniques can be employed for similarity identification. Examples can include Geodesic distance tailored to support products with enriched knowledge wherein the closest distances between nuclei of the product clusters in the knowledge graphs can be used for providing recommendations. Referring back to the example of food items, the distance metric helps to cluster and group different customizations available for particular food items. Furthermore, closest customization options for a given food item category (i.e., a product class) are considered.

The data processing system 100 therefore enables the administrative user to automatically process product information and store the product information in a categorized format within the product ontology 130 without the need for manual data entry. Moreover, as the product features are automatically extracted and the products are categorized, the administrative user may not need to possess domain knowledge for processing the product information. The administrative users are also not required to possess knowledge of domain-specific data sources and the data processing system 100 automatically accesses information from the historical data sources or external data sources 128 as required. The data processing system 100 also benefits end users by supporting natural language queries. As a result the end users can execute customized searches that accurately reflect their requirements and are not constrained in terms of the kind of searches that can be executed.

Figure 2:
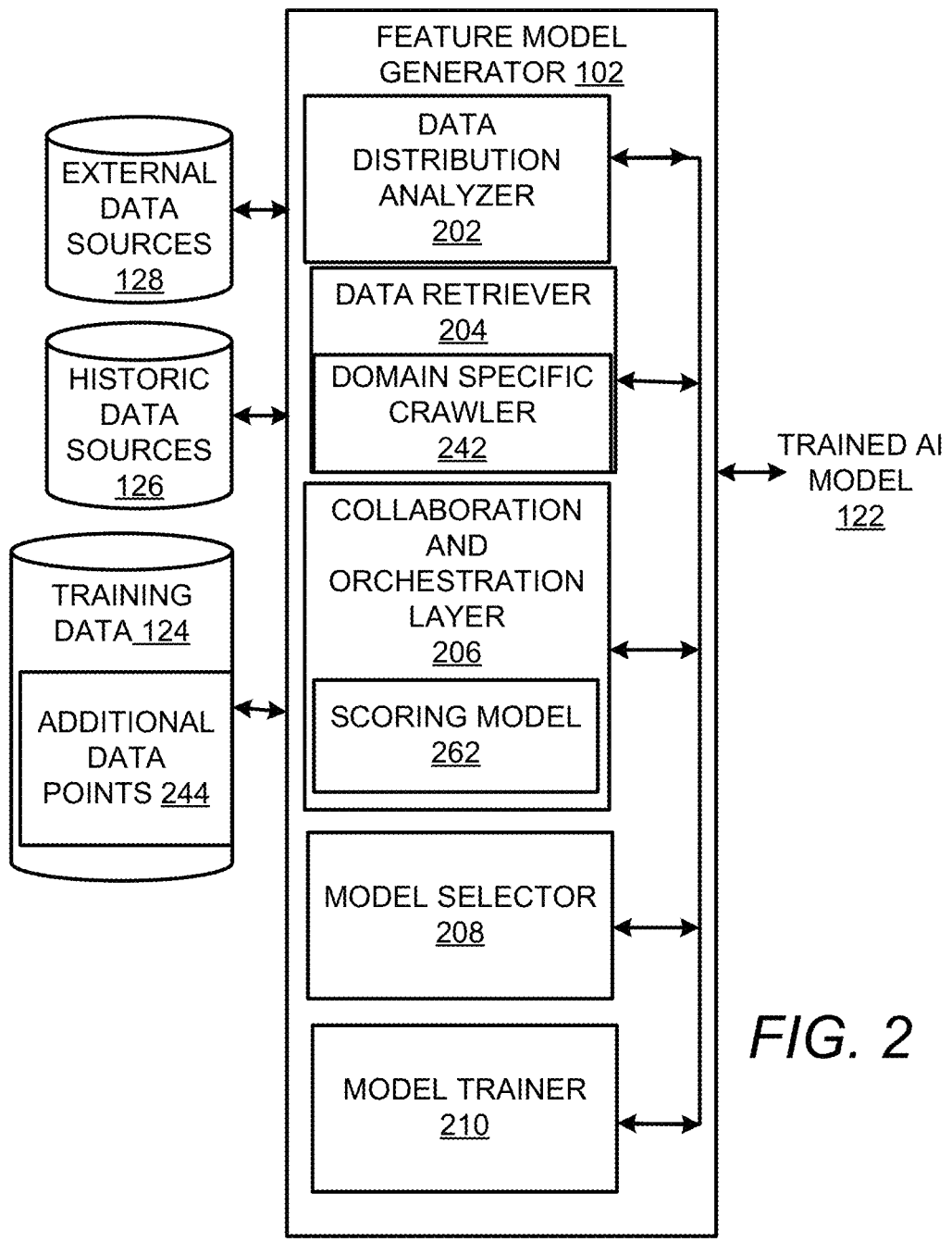
FIG. 2 shows a block diagram of a feature model generator in accordance with the examples disclosed herein.

FIG. 2 shows a block diagram of the feature model generator 102 in accordance with the examples disclosed herein. The feature model generator includes a data distribution analyzer 202, a data retriever 204, a collaboration and orchestration layer 206, a model selector 208 and a model trainer 210. The data distribution analyzer 202 accesses the training data 124 and determines if the training data 124 is sufficiently dense or if the training data 124 meets a data sufficiency requirement in order to be used to train a selected AI model. Referring to the example of food items in a restaurant menu, the training data 124 can include food item data labelled with ingredients, method of cooking (used as adjectives), serving instructions (hot/cold/garnished etc.) and categorized into a plurality of product classes in accordance with the various attributes as described above. The data distribution analyzer 202 can implement an ensemble technique using distance variation from the centroid clubbed with distance threshold learned from the various product classes and historical learning. In an example, the data distribution analyzer 202 can apply Euclidean distance to determine the variation of distances between data points in a particular category. If there is a large variation in the distances of data points from each other for a given product class e.g., appetizer class in the restaurant menu data, then the data within that product class may not satisfy the data sufficiency condition. Similar Euclidean distance computations can be executed for each of the plurality of product classes such as sandwiches, sides, mains, desserts, drinks etc. In addition, the density of the entire training data set 124 can also be obtained. The density of the training data set 124 can be compared to a configurable threshold value (e.g., 0.01) in order to determine the if the datasets constituting the training data 124 are dense enough to train the AI model or if the training data 124 is too sparse and cannot be used to train the AI model. In an example, the data density requirement can include a per-class data density requirement wherein the training data 124 includes a plurality of data sets corresponding to a plurality of product classes.

When the data distribution analyzer 202 determines that the dataset(s) associated with one or more of the product categories are sparse or do not have sufficient number of data points to meet the data density requirement, the data retriever 204 can be configured to retrieve additional data points 244 from the historic data sources 126 or the external data sources 128 to enrich the training data 124. The determination regarding a source of the additional data points can depend on factors such as, but not limited to, how fast the data ages. Certain data can age fast as a result of which the data in the historic data sources 126 become obsolete and unusable. Similarly, if data from the historic data sources 126 is also insufficient or adds bias, the additional data can be retrieved from the external data sources 128. In an example, a user may be allowed to select between the historic data sources 126 or the external data sources for data retrieval via providing a toggle flag.

In order to permit the usage of the external data sources 128, the data retriever 204 can include a domain-specific crawler 242 that enables gathering data from the external data sources 128. In an example, the domain-specific crawler 244 can include a hypertext markup language (HTML) parser that can be configured to crawl the data from particular webpages. Particular universal resource locators (URLs) can be configured for data retrieval by specifying templates wherein particular areas of the webpages are searched for retrieval of specific data. The domain-specific crawler 242 can therefore be custom configured for particular domains/particular organizations using configuration and extraction parameters. The additional data points 244 retrieved from the external data sources 128 may not only enrich the existing data points within the training data 124 but can further add new information. For example, new features or new attributes can be discovered when crawling the latest versions of the webpages.

The data processing system 100 can thus be kept up to date with the addition of such new information from the external data sources 128. Accordingly, the collaboration and orchestration layer 206 selects particular data points from the data retrieved from the historic data sources 126 or the external data sources 128 using the data distribution analyzer 202. More particularly, the collaboration and orchestration layer 206 can select the particular data points based on distance determination e.g., distance of the data points from the centroids of particular product classes. The collaboration and orchestration layer 206 also cleans up the data retrieved from the historic data sources 126 or the external data sources 128 by removing the outliers. In an example, the collaboration and orchestration layer 206 may hold the thresholds for the various distance measures e.g., Euclidean distances, data set density, inter-class distances etc.

In an example, a scoring model 262 can be further implemented to determine the number of data points or the volume of data that is to be added or injected to existing training data. The scoring model 262 generates a score based on the quality of data from the historical data sources 126 and the training data 124 which is enriched or which includes the additional selected data points. The scoring model 262 can be further used to reduce the biasness in prediction score. The scoring model 262 assumes a configurable highest score (e.g., 0.99) and reduces the highest score in a logarithmic manner based on the amount of overlap in data between the different product classes. In an example, techniques including the mixture density injection along with exponential descent based on an increase in density due to the data injection are adopted. The techniques initially require calculation of percentage of enrichment:

$$\text{Mixture Density Injection} = [\{\text{amount of enriched data}\} - \{\text{actual data count}\}]/\{\text{actual data count}\} \quad \text{Eq. (1)}$$

The score is then calculated based on the mixed density. The score calculation is given by:

$$\text{Score} = e^{-\Delta th * \{\text{Mixture Density Injection}\}} \quad \text{Eq. (2)}$$

where $\Delta th$ is the configured threshold. A new training sample corresponding to the training data 124 including the additional data points 244 is thus created which can be a combination of data from existing training data and the selected and cleaned data points.

The model selector 208 selects an AI model for implementation from a plurality of AI models. The plurality of AI models implementing generative techniques or discriminative techniques are available for selection. The selection of the AI model for training may depend on the particular domain in which the data processing system 100 operates. The particular AI model to be implemented can be selected based on factors such as but not limited to inter-class distances, degree of overlap between the various product classes etc. Referring to the example of food items, the plurality of AI models can include random forests, SVMs, etc. Moreover, if the inter-class distance is more than the farthest point from the centroid, then SVM is used in the aforementioned example. However, if the degree of overlap is high, then Random Forest is used. The model trainer 210 trains the selected AI model on the training data 124 (which has been enriched or which now includes additional data points from one of the historic data sources 126 or the external data sources 128) to produce the trained AI model 122.

Figure 3:
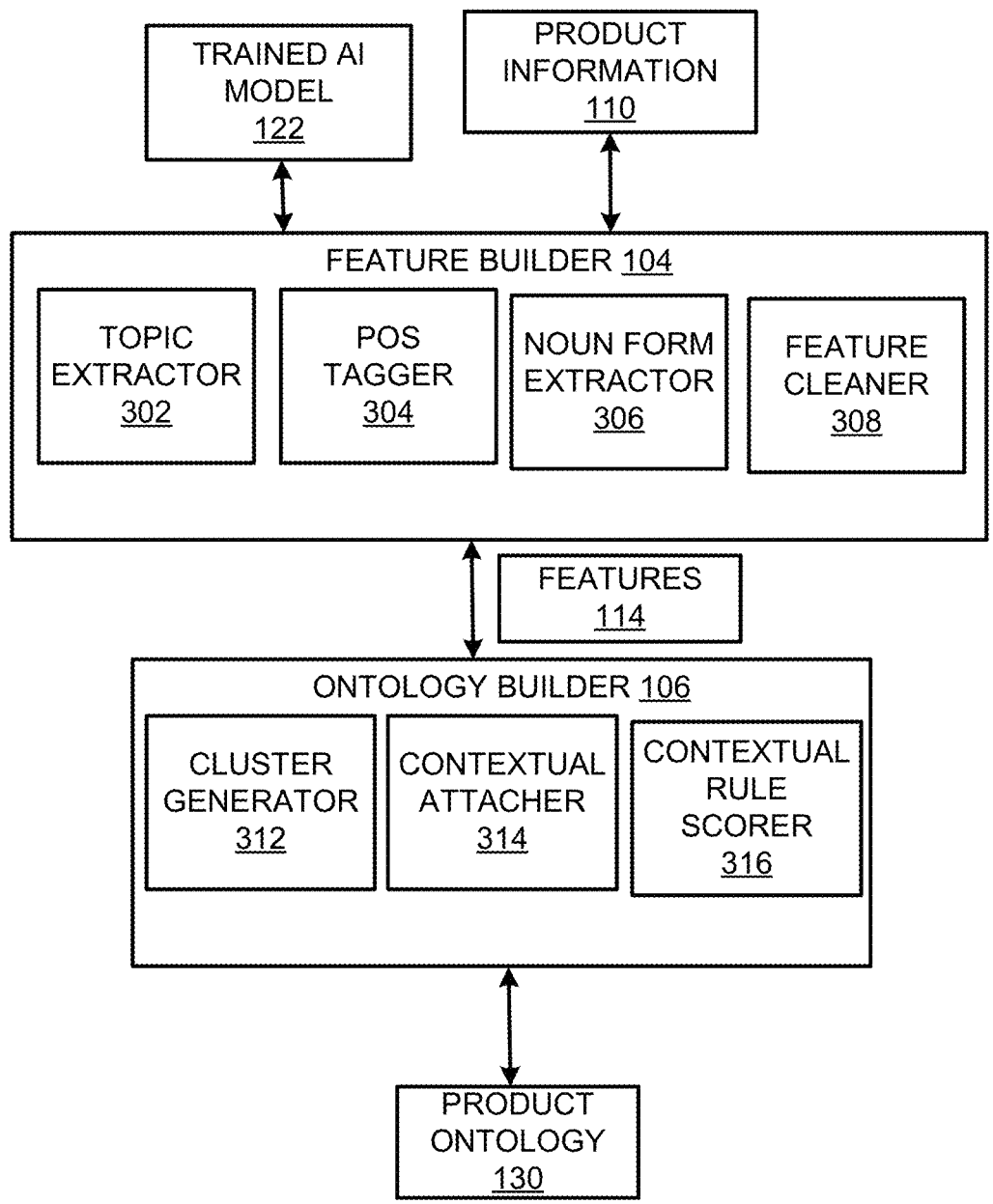
FIG. 3 shows a block diagram of a feature builder and an ontology builder in accordance with the examples disclosed herein.

FIG. 3 shows a block diagram of the feature builder 104 and the ontology builder 106 in accordance with the examples disclosed herein. The feature builder 104 employs the trained AI model 122 for extracting features from the product information 110. The feature builder 104 includes a topic extractor 302 for extracting higher level information regarding products from the product information 110 using the tokens from the input processor 108. In the example where the products pertain to restaurant menu items, the names and the descriptions of the menu items can be initially extracted by the topic extractor 302. The topic extractor 302 can include AI elements such as the trained AI model 122 which can be trained for extracting the names and descriptions of the menu items from tokens of particular portions of documents in the product information 110 such as restaurant menus.

The feature builder 104 further includes a POS tagger 304 for tagging the parsed portions of the product information 110. The key noun forms are then extracted by the noun form extractor 306 from within the names and descriptions of the menu items using the noun separation boundaries from the tokens of the product information 110. The output of the noun form extractor 306 can be considered as the features 114 and may be further processed by the feature cleaner 308. The feature cleaner 308 can remove boundary words and weigh the tokens for identifying the atomic words most commonly used in the training data 124 that can form the key features that can make up the second level of the product ontology 130.

By way of illustration and not limitation, if the product information 110 refers to a restaurant menu, a feature set with members including {chili sauce, bbq sauce, peri peri sauce, MTP sauce, secret sauce, buffalo sauce, specialty sauce, German potato salad, simple salad, toasted roll, Portuguese roll, regular fries, French fries, stable fries, red onion, grilled onion, crispy onion, onion straw, sliced onion, bleu cheese, Swiss cheese, cheddar cheese, mozzarella cheese, American cheese, cream cheese, provolone cheese, pepper jack cheese, marinated chicken, grilled chicken, spicy chicken, brown bread, French bread, ciabatta bread, rye bread} can be extracted. When processed by the feature cleaner 308 the atomic features {Sauce, Salad, Roll, Fries, Onion, Cheese, Chicken, Bread} can be extracted. In an example, the features thus generated can be submitted to the user for quality control prior to being deployed within the data processing system 100. The feature builder 104 therefore can continuously learn boundaries from the user feedback to refine synonyms or commonly used similar topics. In an example, the feature builder 104 can also be configured to build a synonym dictionary by estimating the similarity between the features so that similar features which are termed differently can be identified. For example, a medium size pizza in one restaurant may be referred to as a 10 inch pizza in another restaurant menu. The synonym dictionary enables automatically translating a reference to a "medium pizza" in a user query to cover the 10 inch pizzas also and vice versa.

In an example, the ontology builder 106 can be an extension of the feature builder 104 where the extracted features are aggregated to form the product ontology 130. The extracted features 114 can have multiple levels of relationships forming features, sub-features etc. both within and across the clusters corresponding to the plurality of product classes. Accordingly, a cluster generator 312 generates feature clusters corresponding to the various product classes. The clusters can be generated using the information directly obtained from the product information 110 so that topics under the same sub-headings can be grouped into a cluster. The ontology builder 106 also includes a contextual attacher 314 for associating features with multiple clusters corresponding to multiple product classes. Each context can be assigned a score which is automatically generated using association rule mining. The selection of a threshold score to determine the associations is generated automatically using a contextual rule scorer 316. The features can be arranged in different levels of hierarchy within the product ontology based on the corresponding level from which the features were extracted as detailed further infra.

Figure 4:
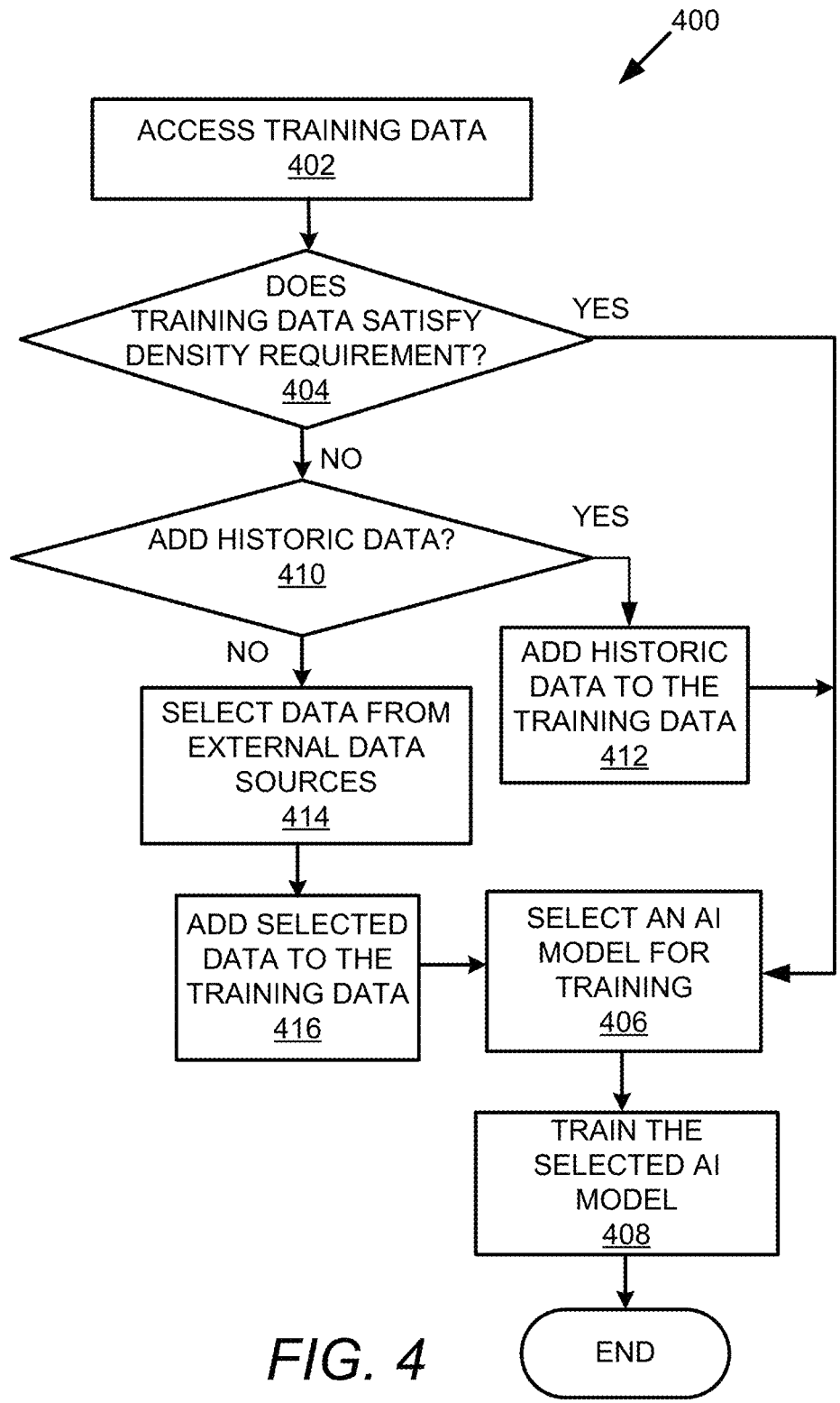
FIG. 4 shows a flowchart that details a method of generating a trained AI model in accordance with the examples disclosed herein.

FIG. 4 shows a flowchart 400 that details a method of generating the trained AI model 122 in accordance with the examples disclosed herein. The method begins at 402 wherein training data for the generation of the trained AI model 122 for product feature extraction is accessed. At 404, it is determined if the training data 124 satisfies a data density requirement or it is determined at 404 if there are sufficient data points within the data sets for each of the plurality of product classes. If it is determined that the training data 124 meets the data density requirements, the method proceeds to 406 to select a AI model for training from a plurality of AI models. The AI model can be selected based on interclass distances or distances between data points belonging to a particular product class and the degree of overlap between datasets in the training data 124 corresponding to the plurality of product classes. At 408, the selected AI model is trained for entity extraction on the training data 124.

If at 404, it is determined that the training data 124 does not satisfy the data density requirement or that there are not sufficient number of data points for training a model for entity extraction for one or more of the plurality of product classes, the method proceeds to 410 to determine if additional data points 244 can be selected from the historic data sources 126. The historic data sources 126 can include application logs of the recommender applications that provide recommendations to users in the same domain in which the data processing system 100 operates to provide recommendations. Factors for the selection of data points from the historic data sources 126 can include the data sets in the historic data sources 126 satisfying the data density requirement or the data being sufficiently fresh to be used for training purposes etc. The data freshness can depend on the particular domain and process. For example, if a campaign is updated every month and the historic data is forty five days old, then the historic data cannot be used. If it is determined at 410 that the additional data points 244 can be selected from the historic data then the necessary additional data points 244 from the historic data sources 126 are added to the training data 124 (i.e., enriched training data) at 412. The method returns to 406 to select an AI model to train in the feature extraction with the enriched data. If it is determined at 410 that the additional data points 244 cannot be selected from the historic data sources 126 either because the historic data is unusable due to age or because it does not meet the data density requirement, the additional data points 244 are selected at 414 from the external data sources 128. In an example, the additional data points 244 from the historic data sources 126 or the external data sources 128 may be selected randomly. The additional data points are added to the training data at 416 and the method returns to 406 to select an AI model to be trained on the enriched training data.

Figure 5:
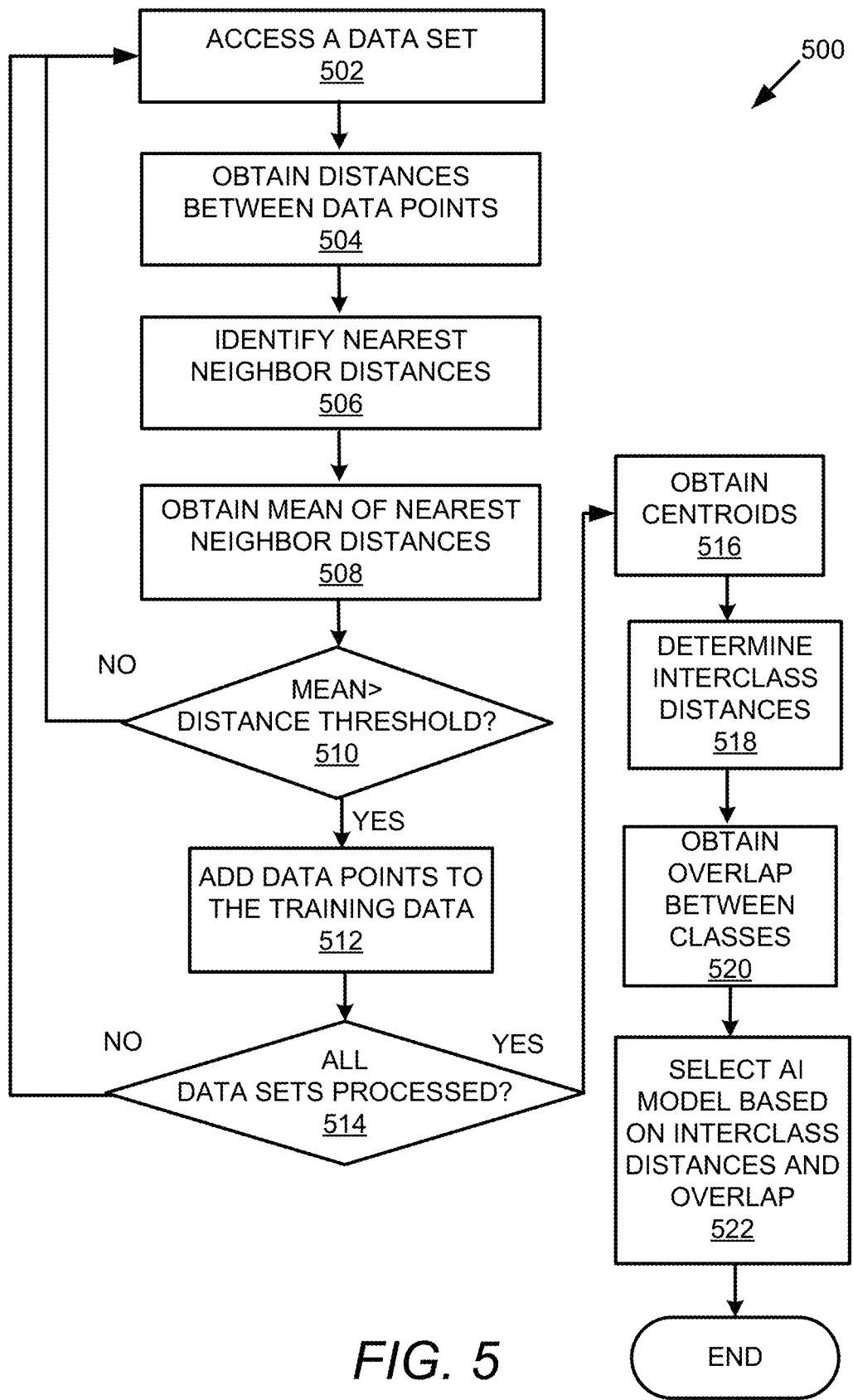
FIG. 5 shows a flowchart that details a method of determining if the training data meets the data density requirement in accordance with the examples disclosed herein.

FIG. 5 shows a flowchart 500 that details a method of determining if the training data meets the data density requirement and identifying an AI model for training in accordance with the examples disclosed herein. The method begins at 502 wherein a dataset in the training data 124 belonging to a product class are accessed. At 504, distances between the data points in the product class are obtained. In an example, the Euclidean distances between the data points can be obtained. The Euclidean distances are used for density estimation of the product class. For density estimation, the distance of each data point from the corresponding nearest neighbor is identified 506 from the distances obtained at 504. The mean value of the nearest neighbor distances are obtained at 508 and are compared with a distance threshold. The distance threshold can be a configurable threshold based, for example, on the domain etc. In the example wherein the training data pertains to features of a restaurant menu item, the threshold may be set to 0.01 units. Accordingly, at 510, it is determined if the mean of the nearest neighbor distances is greater than the distance threshold. If the mean of the nearest neighbor distances is not greater than the distance threshold, it can be determined that the dataset for the product class meets the distance threshold and therefore, the process moves to 502 to select the data set of the next product class. It can be appreciated that the processing of the data sets of the various product classes is discussed serially for illustration purposes only and that the data sets of the various product classes can be processed in parallel in accordance with the examples disclosed herein.

If it is determined at 510 that the mean of the nearest neighbor distances is greater than the distance threshold, it indicates that the dataset for the product class is sparse and needs to be enriched. Accordingly at 512, additional data points 244 are added to the data set from one of the historic data sources 126 or the external data sources 128. At 514, it is determined if the data sets pertaining to all the product classes have been examined for the data density requirement. If data sets remain to the processed, the method returns to 502 for selecting the data set pertaining to the next product class. If, at 514, it is determined that the data sets pertaining to all the product classes have been processed for the distance requirements, the method proceeds to block 516 wherein the centroids for the each of the datasets pertaining to the plurality of product classes are obtained. At 518, the distances between the centroids is obtained to determine the interclass distances. At 520, the distances between the centroid of the product class and the farthest point in the product class is obtained for each of the plurality of product classes. Based on the interclass distances and the degree of overlap between the classes, one of the plurality of AI models is selected for training at 522. In an example, if the degree of overlap is high between classes, random forest model is used. If the mean of the interclass distances is more than the mean of the distances of the farthest point from the centroid, then SVM is used.

Figure 6:
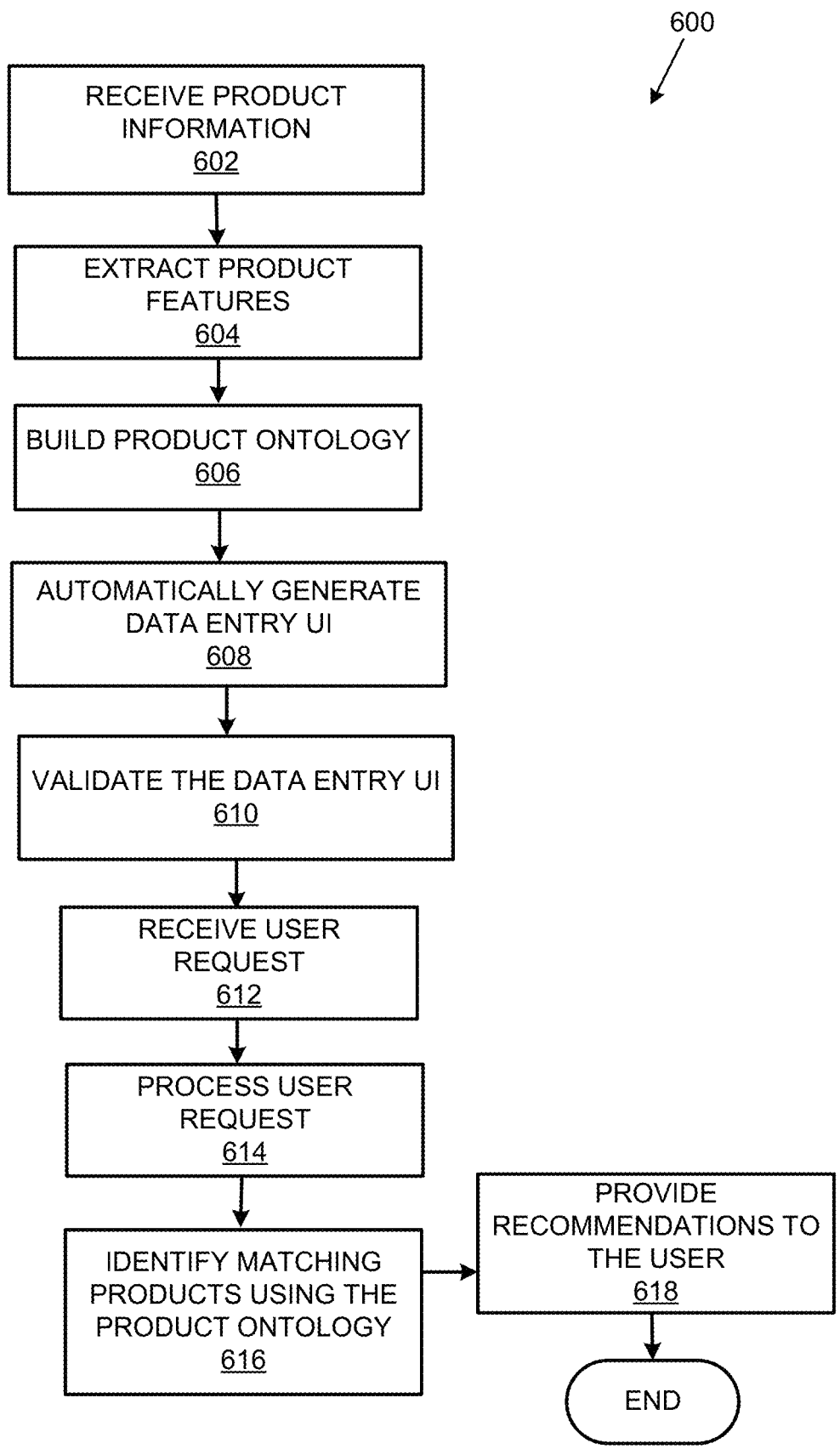
FIG. 6 shows a flowchart that details a method of providing product recommendations and customizations for products in accordance with the examples disclosed herein.

FIG. 6 shows a flowchart 600 that details a method of providing product recommendations and customizations for products in a plurality of product categories in accordance with the examples disclosed herein. The method begins at 602 wherein product information regarding products belonging to a plurality of product classes is received. At 604, the product features are extracted using the trained AI model 122. At 606, the extracted features are used to build the product ontology 130. At 608, one or more data entry user interfaces (UI) such as customization templates can be automatically generated and populated with the extracted data from the product ontology 130. The various fields can be populated based on one or more of the product information received at 602 and the product ontology 130. The customization templates thus generated are validated by the data entry operator at 610. The user validation can enable modifying or otherwise changing automatic customizations or predicted features may not be currently available etc. At 612, a user's request for product recommendations framed in the form of a natural language sentence is received. At 614, the user's request is processed to extract word tokens, POS information etc. At 616, the product ontology 130 is employed to identify products and product customizations matching the user's request. The identified matches or product recommendations are transmitted to the user at 618.

Referring again to the domain of restaurants, prediction of the food category of the products that were not identified by the trained AI model 122 (as a product feature), knowledge graphs are used. Geodesic distance, which identifies the shortest path between the vertices is implemented in this case. This distance metric also helps to cluster and group the different customizations available. Further, the closest customization options connected with the particular category of food items corresponding to the user's query 164 are considered. Also, while creating the knowledge graph the difference between radius and diameter (i.e., the minimum and maximum eccentricities) of the knowledge graph at minimum. This helped to achieve the objective of identifying and grouping the customizations and predict the customizations of a product from knowledge graph. There exist large variations in customizations for food items and the traditional prediction methods fail to predict the customizations along with options and therefore the distance metrics defined herein are used.

Figure 7:
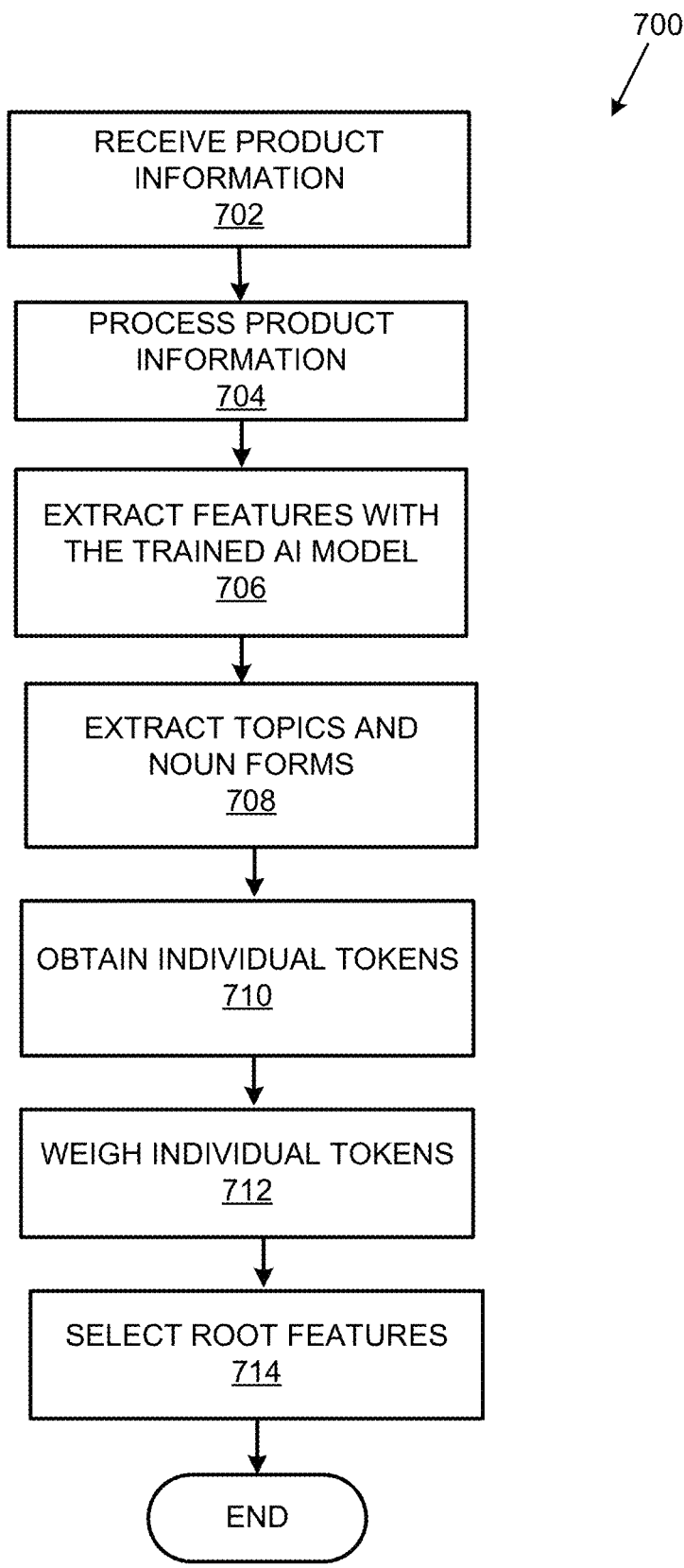
FIG. 7 shows a flowchart that details a method of extracting features in accordance with the examples disclosed herein.

FIG. 7 shows a flowchart 700 that details a method of extracting features in accordance with the examples disclosed herein. The method begins at 702 wherein the product information 110 is received. The product information 110 can be received in different formats including processor-readable formats such as spreadsheets, word processor documents etc. The product information 110 may also be received in non-processor readable formats such as scanned images etc. At 704, the product information 110 is processed by the input processor 108 for parsing, tokenizing and generation of the POS data. If received in non-processor readable formats, the product information 110 may initially be processed by for optical character recognition etc. At 706, the trained AI model 122 is employed for automatic detection of features. The trained AI model 122 implements unsupervised based feature extraction. Further at 708, the topics in the product information 110 are extracted in addition to identifying the noun forms with boundary-based techniques based on historical data. The noun forms include nouns occurring in conjunction with adjectives. Referring back to the example of restaurant menu items, the noun forms from names and descriptions of menu items can be obtained. Also verb/adjective forms such as 'tossed with . . .' or 'a sprinkle of . . .' occurring in conjunction with nouns are also extracted as part of the feature extraction.

More particularly, the output from step 708 are further tokenized to obtain the individual word tokens at 710. The individual word tokens are further weighted at 712 based on their occurrence frequency in the product information 110. The words with the higher weights are selected as the root features at 714. In an example, the features thus extracted can be submitted for manual review for quality check. The input provided in the manual review can be fed back to the AI model 122 as training data.

Figure 8:
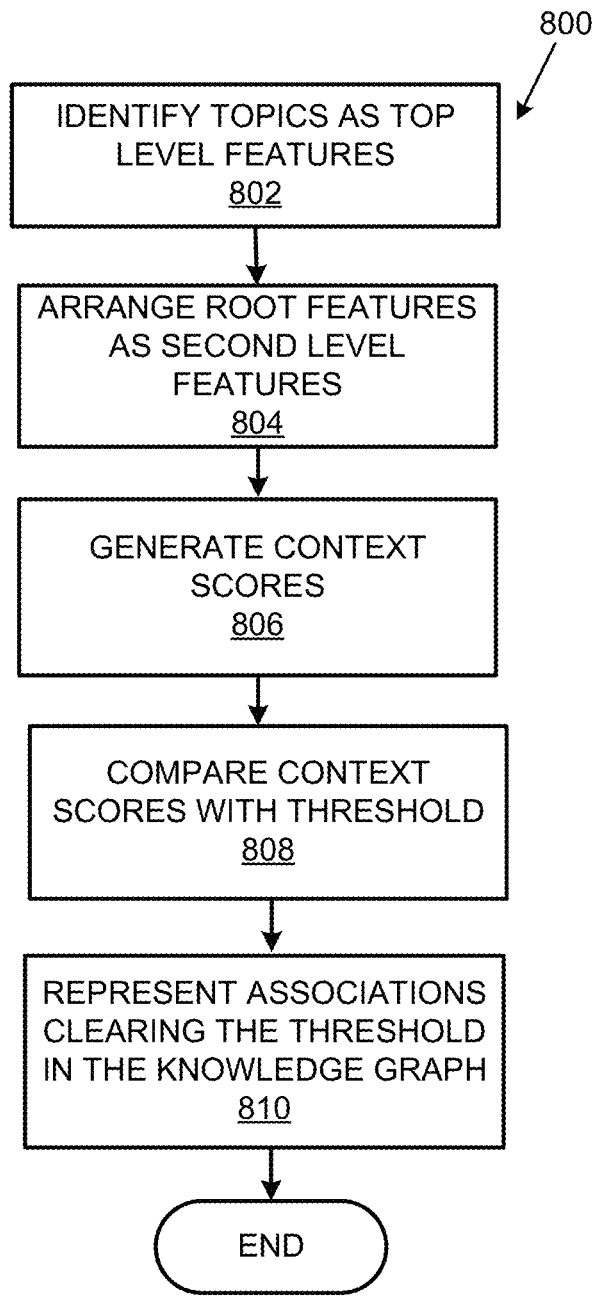
FIG. 8 shows a flowchart that details a method of building the product ontology in accordance with the examples disclosed herein.

FIG. 8 shows a flowchart 800 that details a method of building the product ontology in accordance with the examples disclosed herein. The features extracted from the product information 110 can be arranged in the form of a knowledge graph having multiple levels of features/sub-features in the product ontology 130. The topics extracted from the product information can be initially identified as the top-level features in the knowledge graph at 802. At 804, the root features extracted from the product information 110 can be arranged as second level features in the knowledge graph below the topics based on their co-occurrence with the topics. At 806, context scores for features/sub-features are generated in order to identify the relevant features/sub-features across the clusters (or product classes) using association rule mining. The context scores can be based on parameters including support associated with occurrence of the features, a degree of confidence on the occurrence of the features, individual support of the features within the training data and a confidence level associated with occurrence of the features individually.

Referring to the example of restaurant menu items, the feature score is calculated at feature level (sandwich) and sub feature level (onion) as:

$$P(\{Onion\} | \{Sandwich\}) = \frac{P(\{Onion\} \cap \{Sandwich\})}{P(\{Sandwich\})} \quad \text{Eq. (1)}$$

Further for sub-feature the probability is given by:

$$P(\{\text{red onion}\} \mid \{\text{Onion}\} \cap \{\text{Sandwich}\}) = \frac{P(\{\text{red onion} \cap \text{Onion} \cap \text{Sandwich}\})}{P(\{\text{Onion} \cap \text{Sandwich}\})} \quad \text{Eq. (2)}$$

The context scores are compared with a predetermined score threshold at 808 and at 810, the associations that clear the score threshold are represented in the knowledge graphs.

Figure 9A:
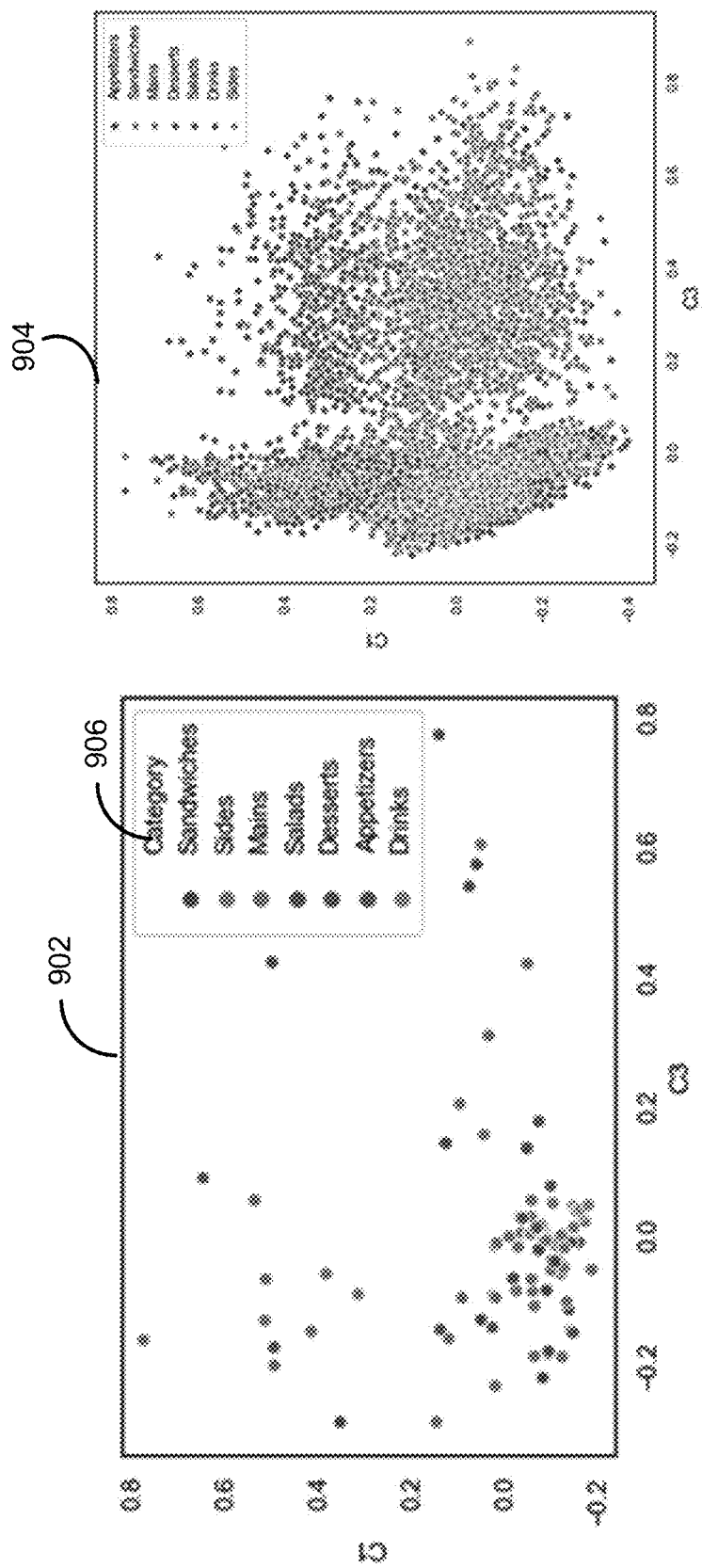
FIG. 9A shows two graphs of the data sets of the plurality of product classes prior to enrichment and after enrichment in accordance with the examples disclosed herein.

FIG. 9A shows two graphs 902 and 904 representing the data sets of the plurality of product classes prior to enrichment and after enrichment respectively in accordance with the examples disclosed herein. The graph 902 shows sparse data points for each of the plurality of product classes shown in the legend 906. As seen from the graph 904, data points have been added for each of the plurality of product classes. The density of the data points in 904 is significantly higher than that of graph 902 which shows that the datasets in 904 can meet the data density requirement and may therefore be used to train the AI model.

FIG. 9B shows a tabular form 950 with the features, sub-features and context scores obtained in accordance with the examples disclosed herein. The initial category 952 can be identified via topic extraction from a restaurant menu. The features 954 correspond to the root features obtained from the descriptions corresponding to the topics in the restaurant menu. The sub-features 956 correspond to the noun forms wherein the nouns occur in conjunction with adjectives, e.g., 'toasted roll', 'simple salad', 'crispy onion' etc. The probabilities 958 show the likelihood of each of the features 954 occurring with the corresponding item in the category 952. Similarly the probabilities 960 are indicative of each of the sub-features occurring with the corresponding feature/category combination. Such probabilities are reflected in the knowledge graphs that make up the product ontology 130. The knowledge graphs enable automatically identifying on-the-fly product customizations to end users when providing recommendations. For example, customizations such as 'German potato salad' or 'simple salad' can be suggested to users due to higher likelihood of '0.25' as opposed to French fries which have a likelihood of '0.1'. Similarly, specialty sauce with a likelihood of '0' may also not be offered as a customization option with sandwiches.

Figure 10:
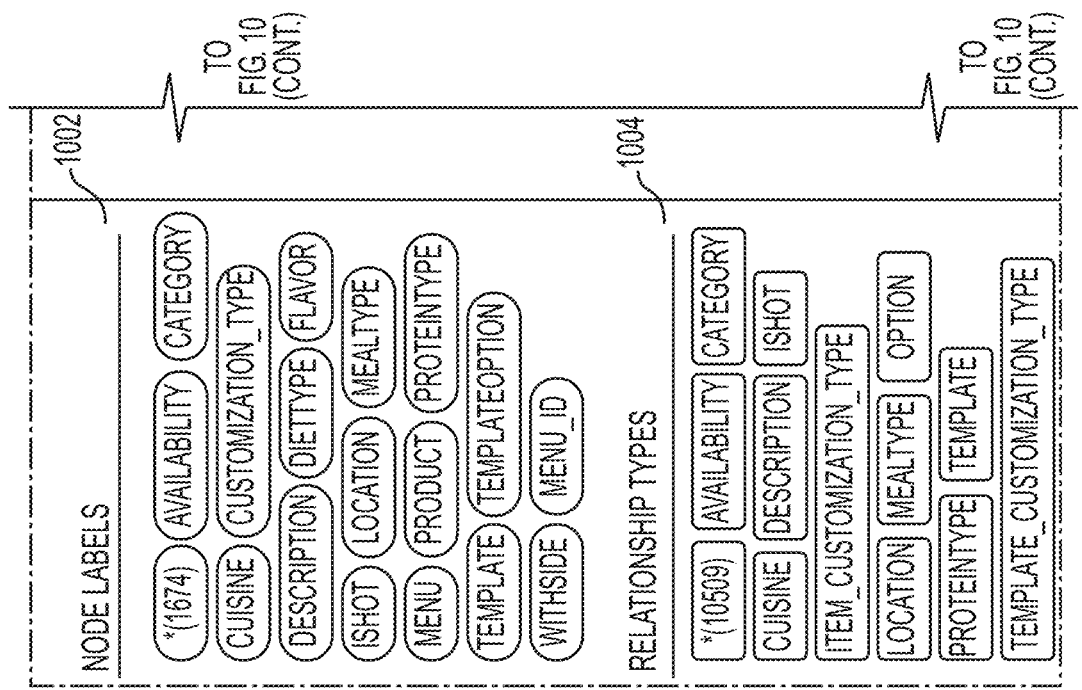
FIG. 10 shows a knowledge graph generated in accordance with the examples disclosed herein.
Figure 10:
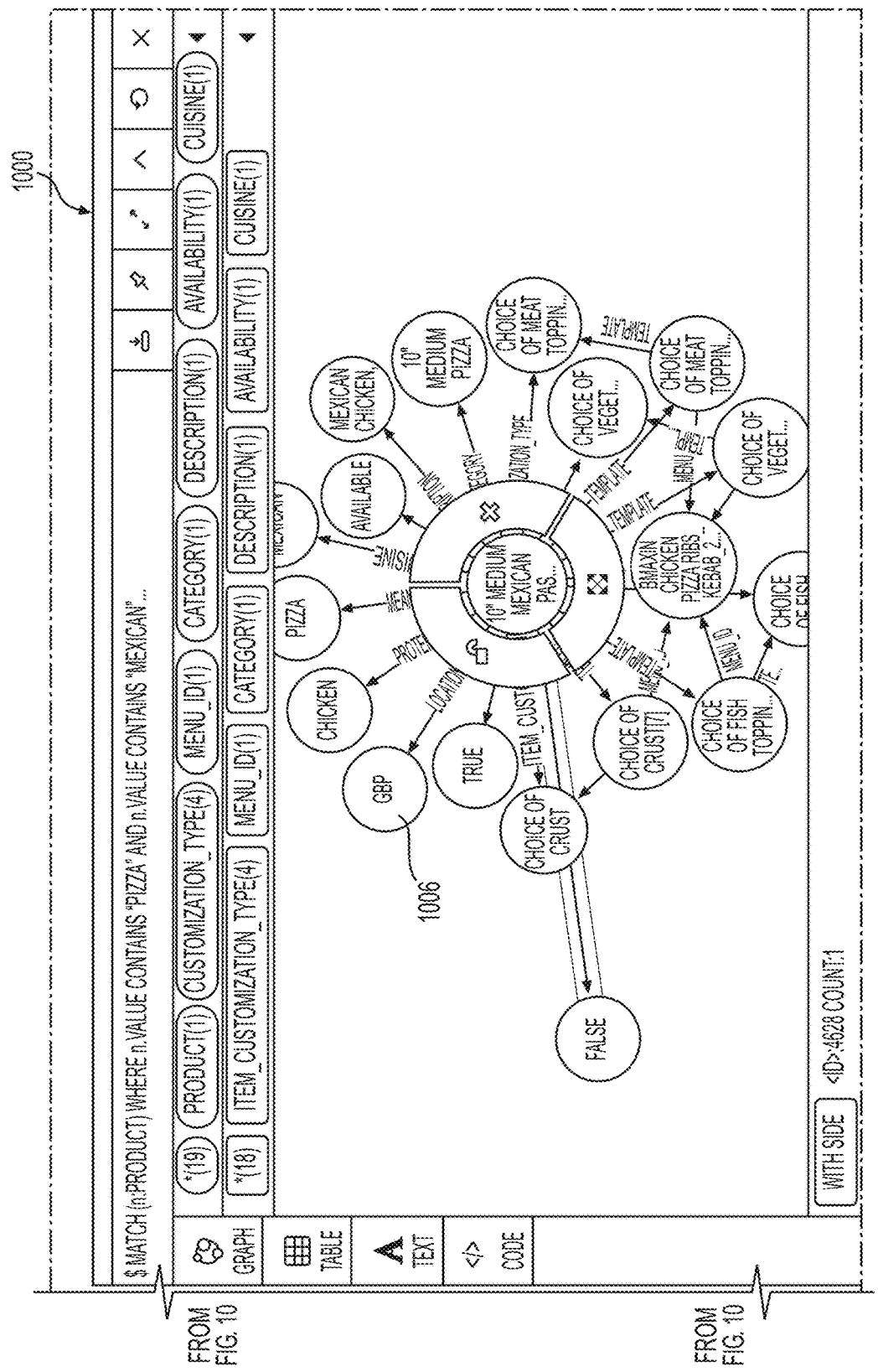

FIG. 10 shows a knowledge graph 1000 generated in accordance with the examples disclosed herein. The knowledge graphs or product ontologies generated in accordance with the examples disclosed herein not only enable responding to user queries with recommendations but also provide for customizations of the product. The knowledge graph 1000 pertains to the domain of restaurant menu items example which has been discussed above and enables the data processing system 100 to provide for customization of a 10 inch, medium pizza. The node labels 1002 and the relationship types 1004 are also shown. Based on the knowledge graph 1000, a customer or the end user 160 requesting a medium pizza may be dynamically presented with customization choices. In an example, the knowledge graphs provide for identifying other food items that are similar to pizza (via the contextual score for example), and suggest customizations from such similar foods to the user selecting options for the medium pizza. The end user being aided with the knowledge graph therefore can receive dynamically identified new customization options that are not otherwise available in static applications that retrieve customization options from a database. Per the knowledge graph 1000, the customization options can include choices of crust, choices of vegetables, choices of meat toppings, choices of fish toppings etc. In addition, the location information 1006 may also be one of the options that restricts the customization options presented to the end user so that only the locally available customization choices are presented. As newer options become available in the product information 110, such options can be automatically presented as customization choices for the end user 160.

Figure 11:
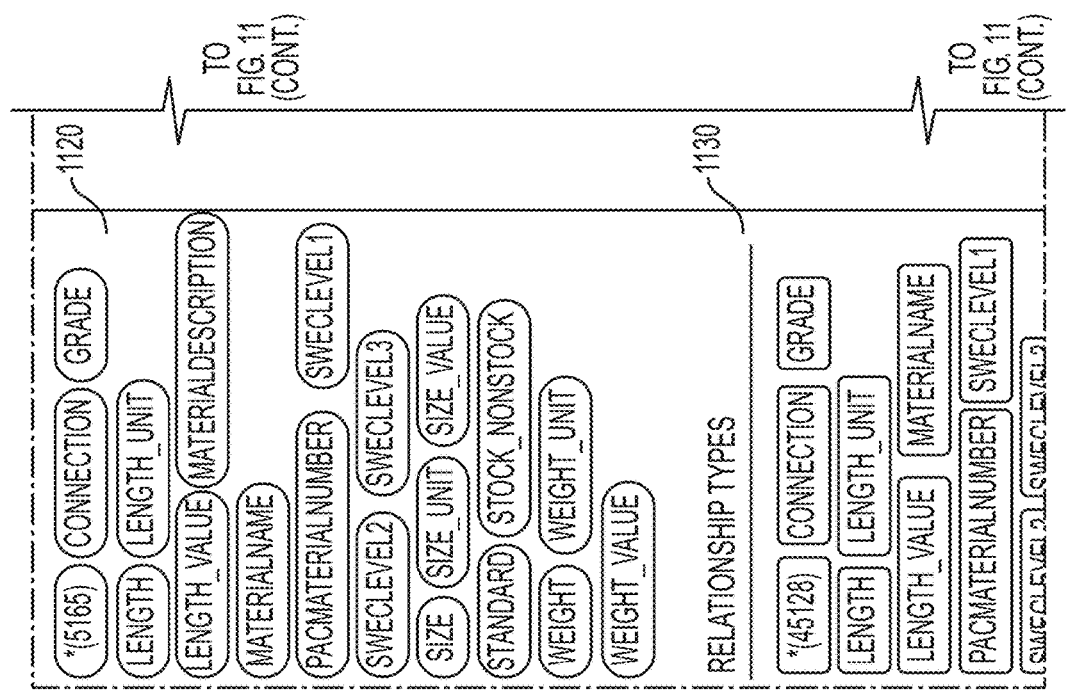
FIG. 11 shows a knowledge graph generated for the equipment used in the oil and gas industry in accordance with the examples disclosed herein.
Figure 11:
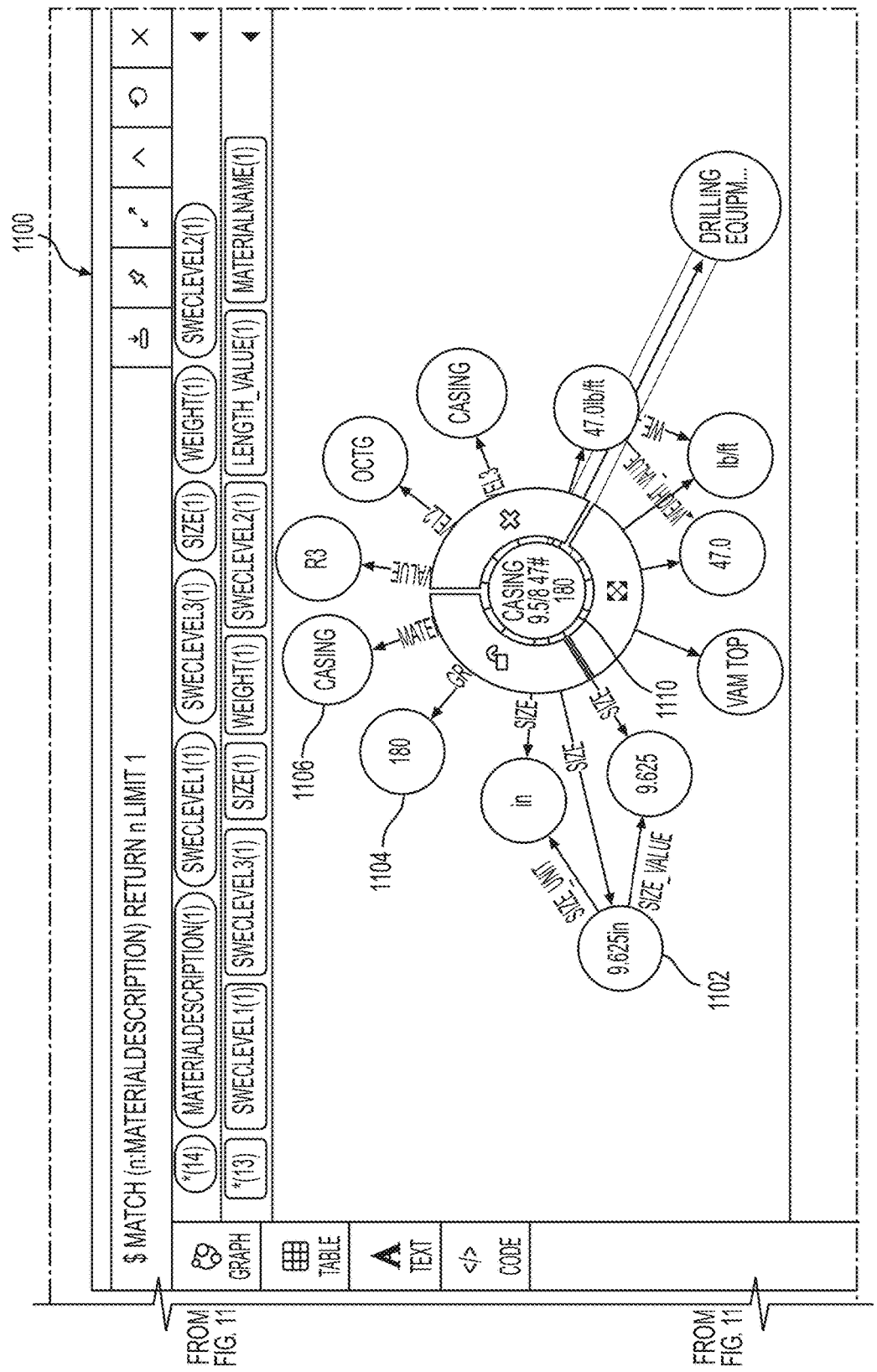

FIG. 11 shows a knowledge graph 1100 generated for the equipment used in the oil and gas industry or domain in accordance with the examples disclosed herein. Various customization options such as size 1102, grade 1104, material 1106 etc. are provided for the casing product 1110. The node labels 1120 and the relationship options 1130 are also shown. The information thus extracted can be used to automatically populate a data entry UI as detailed below. Such auto-generated data entry UIs facilitate automatic extraction and population of data for search and customization purposes as detailed herein.

Figure 12:
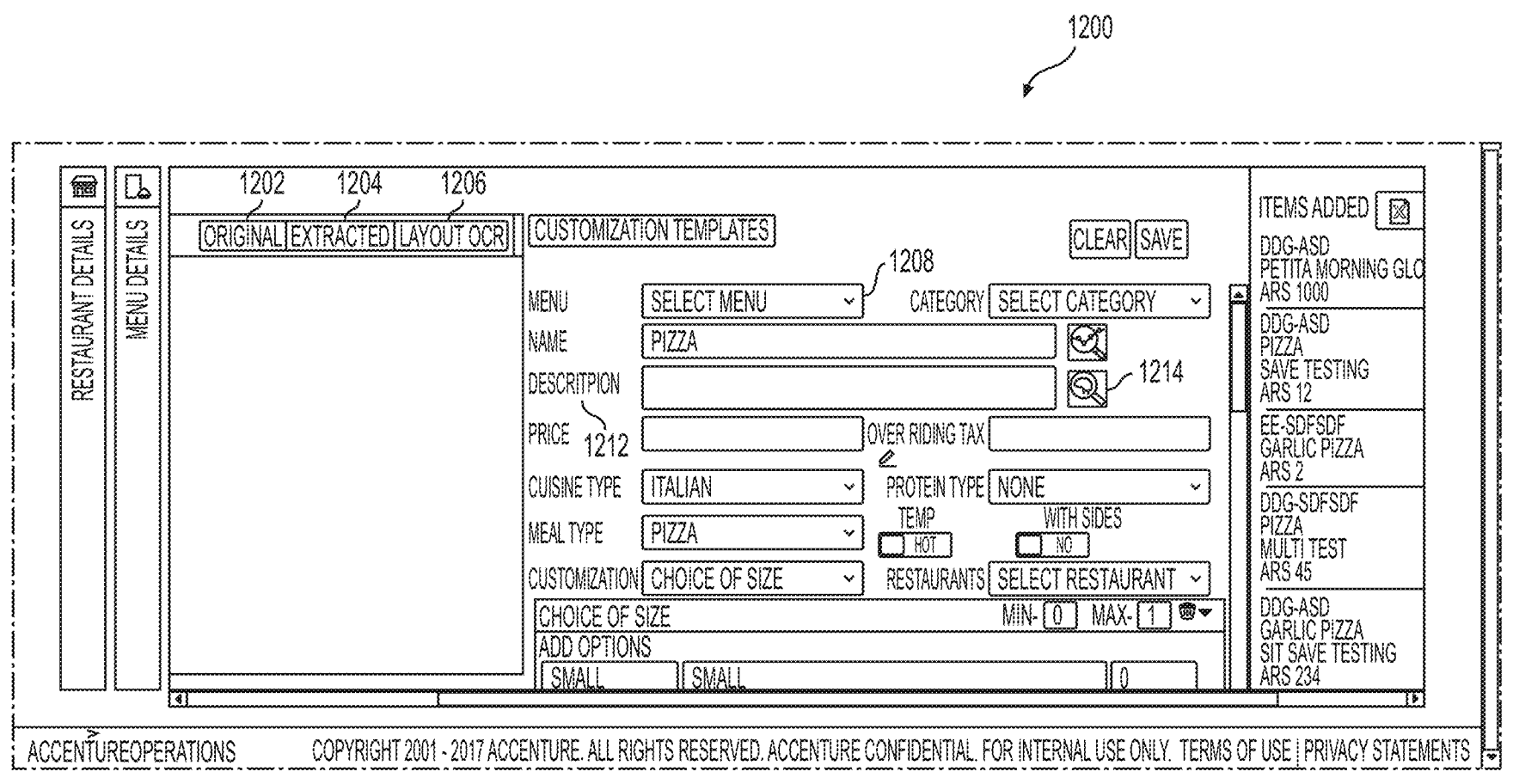

FIG. 12 shows a customization template 1200 that is generated for the restaurant menus in accordance with the examples disclosed herein. The customization template 1200 enables the date entry operator 150 to enter various customization options for each of the different products in the products ontology. Selecting the 'original' tab 1202 on the left hand side (LHS) of the customization template 1200 shows the original scanned menu while selecting the 'extracted' tab 1204 or the 'layout OCR' tab 1206 shows the information extracted from original scanned menu, for example, by converting the original scanned menu into text via tools such as the input processor 108.

Referring now to the right hand side (RHS) of the customization template 1200, on automatic entry of the name from the scanned menu in the name field 1208 and description in the description field 1212 the customization template 1200 allows a search via the search button 1214, so that the processes as detailed herein are executed and the values of the attributes/features of the menu item are predicted. The features thus predicted, e.g., cuisine type, meal type, protein type, is hot and is main, customizations and the options for each customization are automatically placed on the customization template 1200 thereby saving the data entry operator the trouble of labelling the fields and allowing easy data extraction. Furthermore, the corresponding knowledge graph e.g., the knowledge graph 1000 may also enable automatically populating the fields such as cuisine type, meal type etc. with the available options so that the date entry operator 150 merely needs to verify the fields and the available options during the review/validation stage without the need for additional programming. The customization template 1200 is just one example of the data entry UI for food items, but as mentioned above, various features can similarly be extracted depending on type of product and similar data entry UIs can be automatically generated. For example, similar data entry user interface can be automatically generated from the knowledge graph 1100 for the customization of equipment in the oil and gas domain.

FIG. 13 illustrates a computer system 1300 that may be used to implement the AI-based data processing system 100. More particularly, computing machines such as desktops, laptops, smartphones, tablets and wearables which may be used to generate or access the data from the data processing system 100 may have the structure of the computer system 1300. The computer system 1300 may include additional components not shown and that some of the process components described may be removed and/or modified. In another example, a computer system 1300 can sit on external-cloud platforms such as, Amazon Web Services, AZURE cloud or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer-readable medium 1306 may be any suitable medium which participates in providing instructions to the processor(s) 1302 for execution. For example, the processor-readable medium 1306 may be non-transitory or non-volatile medium, such as a magnetic disk or solid-state non-volatile memory or volatile medium such as RAM. The instructions or modules stored on the processor-readable medium 1306 may include machine-readable instructions 1364 executed by the processor(s) 1302 to perform the methods and functions of the data processing system 100.

The data processing system 100 may be implemented as software stored on a non-transitory processor-readable medium and executed by the one or more processors 1302. For example, the processor-readable medium 1306 may store an operating system 1362, such as MAC OS, MS WINDOWS, UNIX, or LINUX, and code 1364 for the data processing system 100. The operating system 1362 may be multi-user, multiprocessing, multitasking, multithreading, real-time and the like. For example, during runtime, the operating system 1362 is running and the code for the data processing system 100 is executed by the processor(s) 1302.

The computer system 1300 may include a data storage 1310, which may include non-volatile data storage. The data storage 1310 stores any data used by the data processing system 100. The data storage 1310 may be used to store the received product information 110, the features 114, the user queries etc.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based data processing system comprising:
    at least one processor;
    a non-transitory processor readable medium storing machine-readable instructions that cause the at least one processor to:
    access initial training data pertaining to a plurality of product classes for training an AI model prior to extraction of product features, the initial training data including information regarding a plurality of products belonging to a plurality of product classes and features of the plurality of products;
    determine that the initial training data fails to meet a per-class data density requirement for training the AI model, the determination regarding the per-class data density requirement being based on a distance variation metric;
    determine that additional data points from one of historical data or external sources are to be added to the initial training data;
    create a new training data by including the additional data points from one of the historical data or the external sources to the initial training data;
    determine interclass distances between the plurality of product classes in the new training data;
    select one of a plurality of AI models for training on the new training data, wherein the AI model is selected based at least on the interclass distances and a degree of overlap between datasets corresponding to the plurality of product classes in the new training data;
    train the AI model selected from the plurality of AI models on the new training data;
    extract product features automatically by employing the trained AI model on received product information of one or more other products belonging to the plurality of product classes;
    build a product ontology via establishing relationships between the one or more other products based on the extracted product features; and
    provide product recommendations to end users based on the product ontology.

2. The system of claim 1, wherein the machine-readable instructions for determining that the new training data meets the per-class data density requirement based on the distance variation metric comprise further machine-readable instructions that cause the processor to:
    apply Euclidean distance methodology for determining distances between data points in datasets of the initial training data, wherein the datasets correspond to each of the plurality of product classes; and
    determine that at least one of the datasets meets the per-class data density requirement if a mean of distances of data points from corresponding nearest neighbors in each of the at least one dataset is less than a distance threshold;
    compute a centroid for each of the datasets;
    determine inter-class distances between the datasets corresponding to the plurality of product classes based on distances between the centroids of the datasets.

3. The system of claim 1, wherein the plurality of AI models include random forest and support vector machines (SVMs).

4. The system of claim 1, wherein the machine-readable instructions for determining if data points from one of historical data or external sources can be added to the initial training data comprise further machine-readable instructions that cause the processor to:
    determine accuracy of the historical data for use in the new training data; and
    use the external sources for obtaining additional data points for the new training data if the historical data is inaccurate.

5. The system of claim 4, wherein the external sources include the Internet and the machine-readable instructions for obtaining additional data points from the external sources include:
    using a domain-specific crawler for gathering data from the Internet.

6. The system of claim 1, further comprising machine-readable instructions that cause the processor to:

determine a volume of the data points to be added to the initial training data by implementing one or more of mixture density injection and exponential descent scoring method for adding the data.

7. The system of claim 6, wherein the machine-readable instructions for employing the mixture density injection and the exponential descent scoring comprise further machine-readable instructions that cause the processor to:
   employ the mixture density injection for determining a number of data points to be added to the initial training data; and
   employ the exponential descent scoring method for determining a score for the new training data including the data points.

8. The system of claim 1, wherein the non-transitory processor readable medium stores further machine-readable instructions that cause the processor to:
   receive product information regarding one or more new products;
   categorize the one or more new products using the product features extracted from the product information; and
   update the product ontology with the one or more new products.

9. The system of claim 8, wherein the machine-readable instructions for providing product recommendations comprise machine-readable instructions that cause the processor to:
   receive a natural language based request for product recommendations.

10. The system of claim 9, wherein the machine-readable instructions for providing product recommendations comprise machine-readable instructions that cause the processor to:
    parse and tokenize the natural language based request;
    tag the tokens with parts of speech (POS) information; and
    match the tokens tagged as nouns and adjectives around the nouns with product features in the product ontology using similarity techniques.

11. The system of claim 1, wherein the machine-readable instructions for building the product ontology via establishing the relationships comprise further machine-readable instructions that cause the processor to:
    create a knowledge graph by establishing the relationships between the products and between the plurality of product classes, wherein difference between a maximum and minimum eccentricity of the knowledge graph is minimized.

12. An artificial intelligence (AI) based data processing method comprising:
    accessing initial training data including data regarding products belonging to a plurality of product classes prior to extraction of product features, the initial training data including information regarding the products and features of the products;
    determining that the initial training data does not meet a per-class data density requirement for training an AI model;
    creating a new training data by adding data from one of historical data sources or external sources to the initial training data;
    determining an overlap between the plurality of product classes in the new training data via a scoring model that scores the new training data;
    selecting the AI model from a plurality of AI models based on interclass distances and a degree of overlap between datasets corresponding to the plurality of product classes in the new training data;
    training the AI model on the new training data for extracting product features;
    receiving information regarding additional products;
    extracting, by the AI model, product features of each of the additional products;
    removing boundary words of the extracted product features;
    identifying atomic words from the extracted product features that are cleaned up, wherein the atomic words commonly occur within the new training data and the atomic words are selected as root features in a hierarchy of features;
    clustering each of the root features based on the plurality of product classes;
    building a product ontology by scoring relationships between each feature of the extracted features with other features of the extracted features; and
    providing product recommendations to a natural language user query using the product ontology and via analyzing at least the user query with the AI model.

13. The method of claim 12, wherein building the product ontology further comprises:
    determine scores attached to each of the root features and sub-features combination with each of other root feature and sub-features across the plurality of product classes.

14. The method of claim 13, wherein the scores are determined based on parameters including support associated with occurrence of the root features and sub-features, a degree of confidence on the occurrence of the root features and sub-features, individual support of the root features and sub-features within the new training data and a confidence level associated with occurrence of the root features and sub-features individually.

15. The method of claim 12, wherein analyzing at least the user query with the AI model further comprises:
    extracting one or more product features from the user query via the AI model.

16. The method of claim 15, wherein analyzing at least the user query with the AI model further comprises:
    identifying products from the product ontology for the product recommendations using similarity techniques.

17. The method of claim 16, wherein identifying products from the product ontology using similarity techniques further comprises:
    creating a multi-variant graphical representations of feature clusters associated with the plurality of product classes; and
    determining closest distances between nuclei of the clusters.

18. A non-transitory processor-readable storage medium comprising machine-readable instructions that cause a processor to:
    access initial training data pertaining to a plurality of product classes for training an AI model prior to extraction of product features, the initial training data including information regarding a plurality of products belonging to a plurality of product classes and features of the plurality of products;
    determine that the initial training data fails to meet a per-class data density requirement for training the AI model, the determination regarding the per-class data density requirement being based on a distance variation metric;

determine that data points from one of historical data or external sources are to be added to the initial training data;

create a new training dataset by adding the data points from one of the historical data or the external sources to the initial training data;

determine interclass distances between the plurality of product classes in the new training dataset via a scoring model that scores the new training dataset;

select one of a plurality of AI models for training on the new training dataset, wherein the AI model is selected based at least on interclass distances and a degree of overlap between datasets corresponding to the plurality of product classes in the new training data;

train the AI model selected from the plurality of AI models on the new training data;

extract product features automatically by employing the trained AI model on received product information of one or more other products belonging to the plurality of product classes;

build a product ontology via establishing relationships between the one or more other products based on the extracted product features; and provide product recommendations to end users based on the product ontology.

19. The non-transitory processor-readable storage medium of claim 18, wherein the machine-readable instructions for building the product ontology further comprising machine-readable instructions that cause the processor to:

remove boundary words of the extracted product features; and identify atomic words from the extracted product features that are cleaned up, wherein the atomic words commonly occur within the new training data and the atomic words are selected as root features in a hierarchy of features.

20. The non-transitory processor-readable storage medium of claim 19, wherein the machine-readable instructions for building the product ontology further comprising machine-readable instructions that cause the processor to:

cluster each of the root features based on the plurality of product classes; and build the product ontology by scoring relationships between each feature of the root features and sub-features.

* * * * *